(12) United States Patent
Zhang et al.

(10) Patent No.: US 11,281,391 B2
(45) Date of Patent: Mar. 22, 2022

(54) METHOD, DEVICE, AND COMPUTER PROGRAM FOR MIGRATING BACKUP SYSTEM

(71) Applicant: EMC IP Holding Company LLC, Hopkinton, MA (US)

(72) Inventors: Yuting Zhang, Chengdu (CN); Kaikai Jia, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/917,812

(22) Filed: Jun. 30, 2020

(65) Prior Publication Data
US 2021/0349651 A1    Nov. 11, 2021

(30) Foreign Application Priority Data
May 6, 2020    (CN) .......................... 202010374623.0

(51) Int. Cl.
*G06F 12/00*    (2006.01)
*G06F 3/06*    (2006.01)
*G06F 9/455*    (2018.01)

(52) U.S. Cl.
CPC ............ *G06F 3/0647* (2013.01); *G06F 3/065* (2013.01); *G06F 3/067* (2013.01); *G06F 3/0619* (2013.01); *G06F 3/0664* (2013.01); *G06F 9/45558* (2013.01)

(58) Field of Classification Search
None
See application file for complete search history.

(56) References Cited

U.S. PATENT DOCUMENTS

| 2009/0083563 A1* | 3/2009 | Murase | ............... G06F 11/1453 713/324 |
| 2021/0042194 A1* | 2/2021 | Bode | .................... G06F 11/1451 |

* cited by examiner

*Primary Examiner* — Daniel D Tsui
(74) *Attorney, Agent, or Firm* — Chamberlain, Hrdlicka, White, Williams & Aughtry

(57) ABSTRACT

The present disclosure relates to a method, a device, and a computer program for migrating a backup system. A method for migrating a backup system includes: storing a backup copy from a first backup system to a second backup system, wherein the first backup system is used to store historical backup copies of an application system, and the second backup system is used to store future backup copies of the application system; dividing the backup copy into multiple backup extents; receiving a backup request for backing up a data object in the application system; and backing up, based on a comparison between the data object and the multiple backup extents, the data object to the second backup system to form a backup copy corresponding to the data object.

18 Claims, 9 Drawing Sheets

METHOD, DEVICE, AND COMPUTER PROGRAM FOR MIGRATING BACKUP SYSTEM

CROSS-REFERENCE TO RELATED APPLICATIONS

The application claims priority to Chinese Patent Application No. 202010374623.0 filed on May 6, 2020. Chinese Patent Application No. 202010374623.0 is hereby incorporated by reference in its entirety.

TECHNICAL FIELD

Various implementations of the present disclosure relate to the management of backup systems, and more particularly, to a method, a device, and a computer program product for migrating from one backup system to another.

BACKGROUND

With the development of computer technologies, many types of application systems have been developed. An application system may include a large number of data objects. To ensure the stable operation of the application system, data objects can be backed up at different time points to form backup copies. The backup copies can be stored to a dedicated backup system. If, for example, the application system malfunctions, a backup copy can be retrieved from the backup system, and the data objects in the application system can be restored to the version of the retrieved backup copy. As backup technologies advance, users may purchase new backup systems. When this occurs, the users are faced with a difficult task of migrating from an existing backup system to a new backup system

SUMMARY OF THE INVENTION

Therefore, it is expected to develop and implement a technical solution for migrating a backup system in a more effective manner. It is expected that this technical solution can be compatible with existing application systems, and by modifying various configurations of a backup system, can perform operations related to migrating a backup system in a more effective manner.

According to a first aspect of the present disclosure, a method for migrating a backup system is provided. This method includes: storing a backup copy from a first backup system to a second backup system, wherein the first backup system is used to store historical backup copies of an application system, and the second backup system is used to store future backup copies of the application system; dividing the backup copy into multiple backup extents; receiving a backup request for backing up a data object in the application system; and backing up, based on a comparison between the data object and the multiple backup extents, the data object to the second backup system to form a backup copy corresponding to the data object.

According to a second aspect of the present disclosure, an electronic device is provided, including: at least one processor; and a memory coupled to the at least one processor and having instructions stored therein, wherein the instructions, when executed by the at least one processor, cause the device to perform actions for migrating a backup system. The actions include: storing a backup copy from a first backup system to a second backup system, wherein the first backup system is used to store historical backup copies of an application system, and the second backup system is used to store future backup copies of the application system; dividing the backup copy into multiple backup extents; receiving a backup request for backing up a data object in the application system; and backing up, based on a comparison between the data object and the multiple backup extents, the data object to the second backup system to form a backup copy corresponding to the data object.

According to a third aspect of the present disclosure, a computer program product is provided. The computer program product is tangibly stored on a non-transitory computer-readable medium and includes machine-executable instructions that are used to implement the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example and not limitation. In the accompanying drawings.

DETAILED DESCRIPTION

Hereinafter, preferred implementations of the present disclosure are described in more detail with reference to the accompanying drawings. Although preferred implementations of the present disclosure are shown in the accompanying drawings, it should be understood that the present disclosure can be implemented in various forms and should not be limited by the implementations set forth herein. Rather, these implementations are provided so that the present disclosure is more thorough and complete, and the scope of the present disclosure is fully conveyed to those skilled in the art.

As used herein, the term "include" and variations thereof mean open-ended inclusion, that is, "including but not limited to." Unless specifically stated, the term "or" means "and/or." The term "based on" means "based at least in part on." The terms "one example implementation" and "one implementation" mean "at least one example implementation." The term "another implementation" means "at least one further implementation." The terms "first," "second," etc. may refer to different or the same objects. Other explicit and implicit definitions may further be included below.

Figure 1:
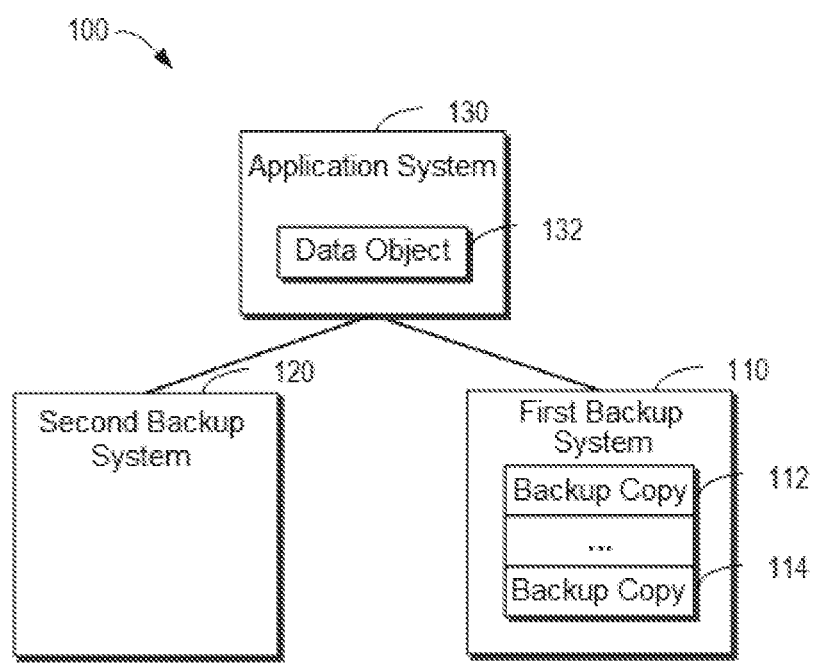
FIG. 1 schematically illustrates a block diagram of an application environment in which an example implementation of the present disclosure can be used.

An application environment for an example implementation of the present disclosure is described with reference to FIG. 1. FIG. 1 schematically illustrates block diagram 100 of an application environment in which an example implementation of the present disclosure can be used. As shown in FIG. 1, application system 130 may be a user's application system, and application system 130 may include one or more data objects 132. It may be understood that application system 130 here may include application systems for performing various functions. For example, application system 130 may be a user's personal computer. At this moment, application system 130 may include various types of data objects. For example, the data objects may include files or directories of files. Particularly, the files may include text files, image files, audio files, video files, etc. For another example, the data objects may further include application system images and/or other types of files.

Alternatively and/or additionally, application system 130 may further include servers for providing various services. For example, application system 130 may include an email service system, a bank service system, an on-line sales service system, and so on. Hereinafter, for convenience of description, a specific implementation of the present disclosure is described by only using a personal computer as an example of an application system.

Data objects 132 can be backed up at different time points to generate corresponding backup copies. Application system 130 may store the generated backup copies to first backup system 110 to form backup copy 112, ..., and backup copy 114 that are generated respectively at different time points. For better performance and/or for other reasons, a user may wish to migrate the backup system. It may be understood that the migration here refers to replacing first backup system 110 with second backup system 120. First backup system 110 is used to store historical backup copies of application system 130 prior to the migration, and second backup system 120 is used to store future backup copies of application system 130 after the migration.

After the migration, during the future operation of application system 130, a backup copy of data object 132 may be backed up to second backup system 120 according to a backup request. In an initial phase when second backup system 120 is started, second backup system 120 does not include any data. At this moment, when application system 130 backs up a newly generated backup copy of data object 132 to second backup system 120, a full backup has to be performed. Full backup here refers to copying all data in the backup copy to second backup system 120, which causes the initial phase of the operation of second backup system 120 to involve a large amount of data transmission and occupy a high bandwidth.

In order to solve the defects in existing technical solutions, an example implementation of the present disclosure proposes a technical solution for migrating a backup system. In this technical solution, a warm-up operation can be performed for second backup system 120. In the warm-up operation, at least a part of the backup copies in first backup system 110 can be stored to second backup system 120. With the example implementation of the present disclosure, it can be ensured that, in an initial phase after migration, second backup system 120 has already included some portion of the backup copies. In this way, the possibility of performing a full copy can be reduced, and thus the amount of data transmitted from application system 130 to second backup system 120 may be reduced, and the required bandwidth may be reduced.

Figure 2:
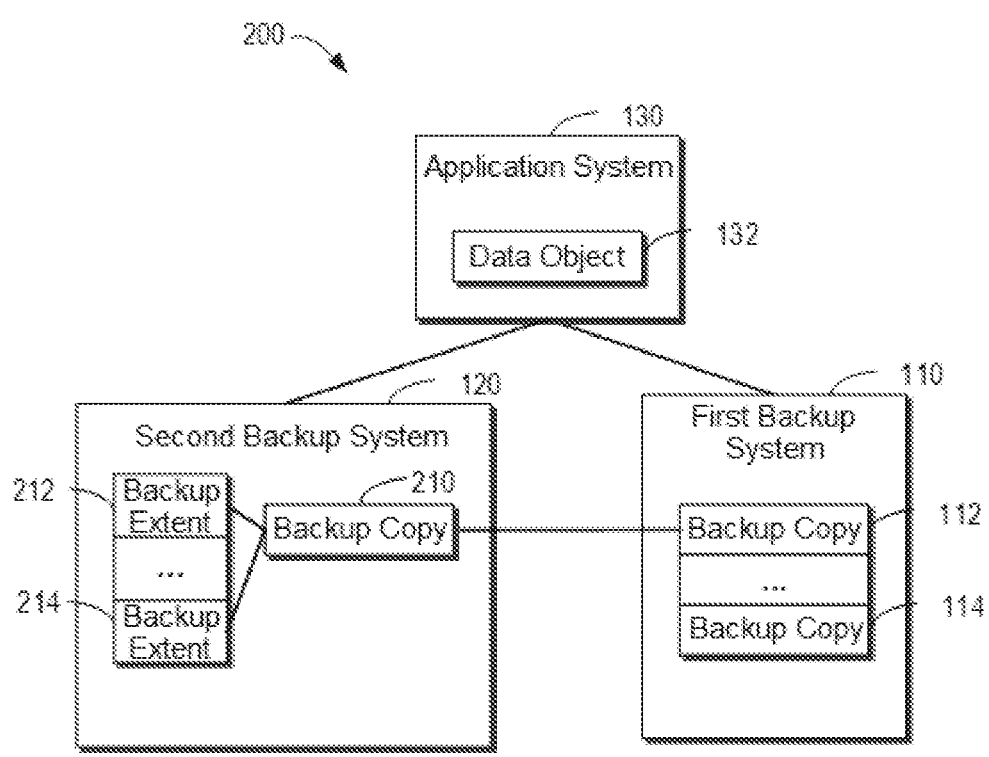
FIG. 2 schematically illustrates a block diagram of a process for migrating a backup system according to an example implementation of the present disclosure.

Hereinafter, an overview of an example implementation according to the present disclosure is described with reference to FIG. 2. FIG. 2 schematically illustrates block diagram 200 of a process for migrating a backup system according to an example implementation of the present disclosure. As shown in FIG. 2, one or more backup copies (e.g., backup copy 112) from first backup system 110 can be stored to second backup system 120 to form backup copy 210. Backup copy 210 is divided into multiple backup extents 212, ..., and 214. At this moment, second backup system 120 is no longer empty in the initial phase; instead, it already includes backup extents 212, ..., and 214. When a backup request for backing up data object 132 in application system 130 is received, data object 132 may be compared with multiple backup extents 212, ..., and 214 to determine which data in data object 132 needs to be transmitted to second backup system 120.

Figure 3:
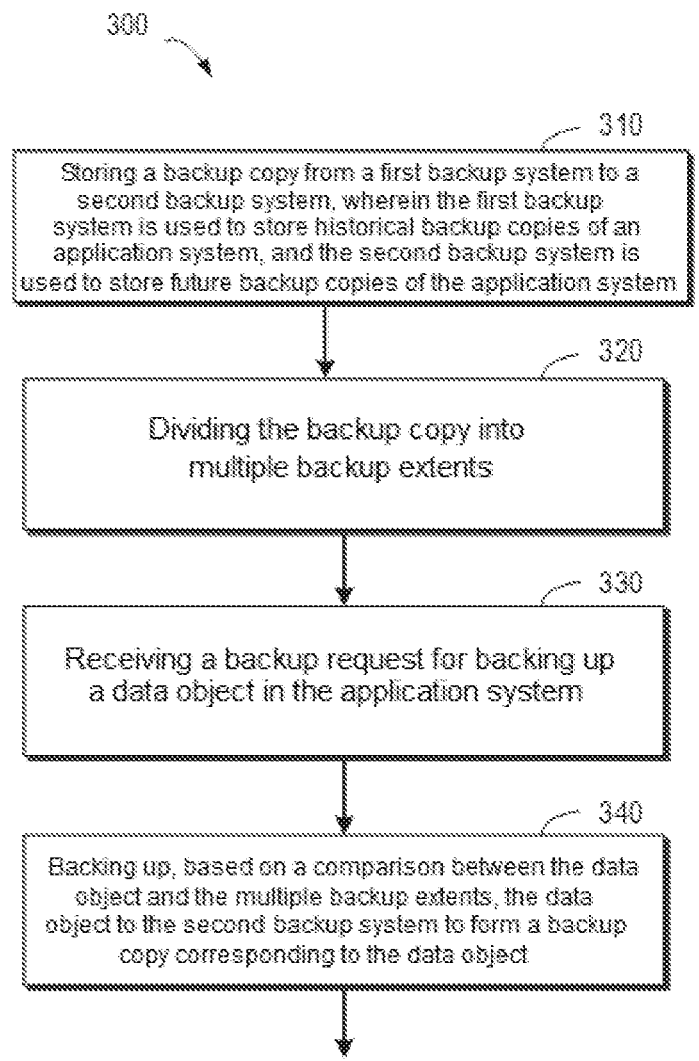
FIG. 3 schematically illustrates a block diagram of a method for migrating a backup system according to an example implementation of the present disclosure.

Hereinafter, more details of an example implementation according to the present disclosure is described with reference to FIG. 3. FIG. 3 schematically illustrates a block diagram of method 300 for migrating a backup system according to an example implementation of the present disclosure. Method 300 can be performed in second backup system 120. Particularly, a function for performing method 300 can be added to, for example, a manager of second backup system 120. With the example implementation of the present disclosure, performing method 300 in second backup system 120 may facilitate directly storing a backup copy retrieved from first backup system 110 into second backup system 120. In this way, it is possible to improve the efficiency of data transmission and reduce an extra bandwidth that may be caused by performing method 300 at other processing devices.

Figure 4:
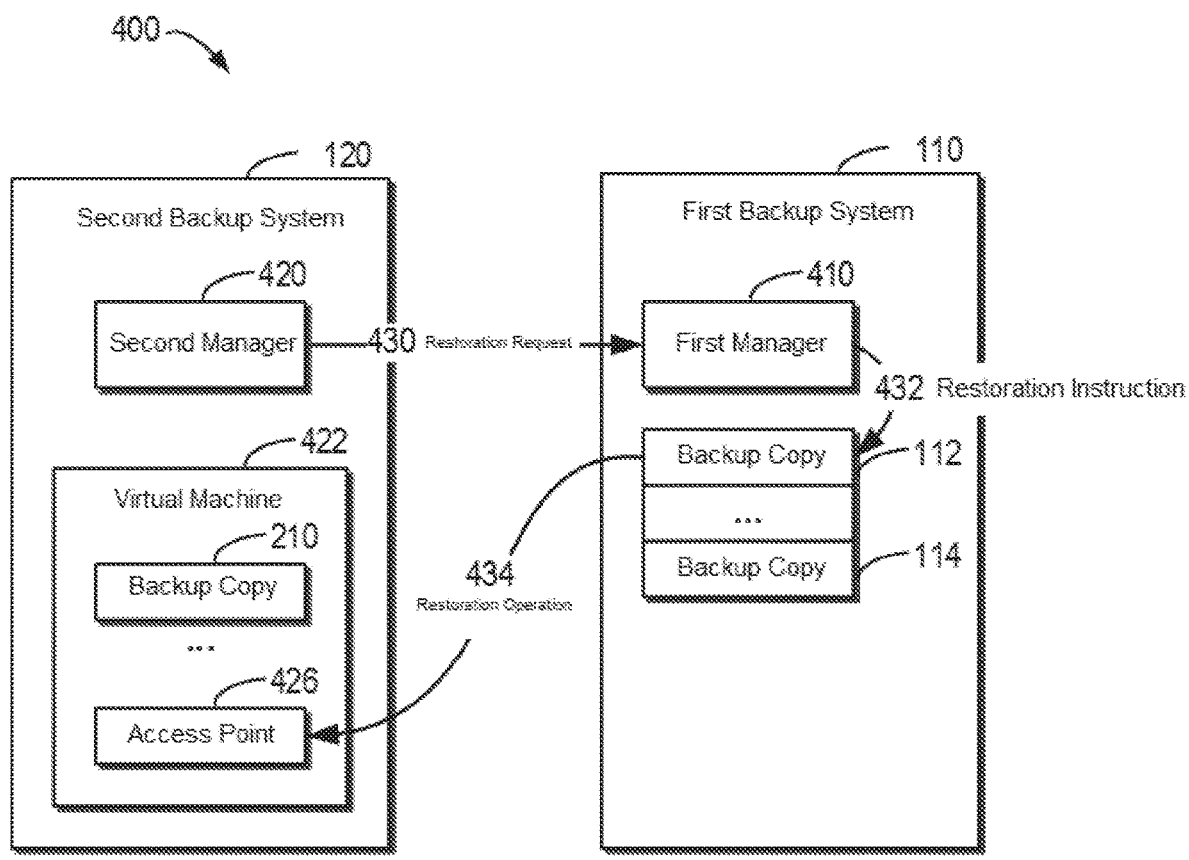
FIG. 4 schematically illustrates a block diagram of a process for acquiring a backup copy from a first backup system according to an example implementation of the present disclosure.

At block 310, a backup copy from first backup system 110 is stored to second backup system 120. It may be understood that first backup system 110 here is used to store historical backup copies of application system 130 and second backup system 120 is used to store future backup copies of application system 130. Hereinafter, how to acquire a backup copy from first backup system 110 is described with reference to FIG. 4. FIG. 4 schematically illustrates block diagram 400 of a process for acquiring a backup copy from first backup system 110 according to an example implementation of the present disclosure. As shown in FIG. 4, second backup system 120 may include second manager 420. Second manager 420 may perform various processes: for example, a process related to a warm-up operation, and a process related to a normal backup operation for managing second backup system 120 after the warm-up operation.

It may be understood that when application system 130 uses first backup system 110, application system 130 may log in to first backup system 110 using configuration information (for example, an account number and a password). In the warm-up phase, second manager 420 may establish a communication connection between second backup system 120 and first backup system 110 with configuration information for accessing first backup system 110. Then, restoration request 430 for restoring the backup copy may be sent to first backup system 110 via the established communication connection. An identifier of a backup copy that is expected to be restored may be specified in restore request 430. For example, backup copy 112 may be specified as being expected to be restored.

It may be understood that although an account number and a password are used above as a specific example of the configuration information to describe how to log in to first backup system 110 from second backup system 120, according to an example implementation of the present disclosure, first backup system 110 may also be logged in to based on other configuration information. For example, the validity of the login can be verified based on trust certificates and/or in other manners. After it has been confirmed that the login is valid, second manager 420 of second backup system 120 may send a restoration request to first backup system 110.

It may be understood that, during the warm-up phase of second backup system 120, first backup system 110 may still be in a normal operation state. By using the configuration information related to login to access first backup system 110, in one aspect, it can be ensured that second backup system 120 can normally log in to first backup system 110 and retrieve the expected backup copy; in another aspect, it can also be ensured that first backup system 110 is still in a protected state, thereby preventing malware from illegally accessing first backup system 110.

Generally speaking, after first backup system 110 receives a normal restoration request from application system 130, first backup system 110 will send a backup copy of a specified version (e.g., backup copy 112) to application system 130. After application system 130 receives backup copy 112, the data object in application system 130 can then be restored to the version corresponding to backup copy 112. In second backup system 120, virtual machine 422 may be established as a destination device for receiving a backup copy. As shown in FIG. 4, access point 426 may be set for virtual machine 422 to receive a backup copy from first backup system 110.

According to an example implementation of the present disclosure, the backup copy in first backup system 110 can be restored to virtual machine 422 according to receipt of a response to restoration request 430 from first backup system 119. Particularly, after receiving restoration request 430 from second backup system 120, first manager 410 of first backup system 110 may issue restoration instruction 432 to transmit backup copy 112, which is expected to be restored, to access point 426 of second backup system 120 through restoration operation 434, thereby forming backup copy 210 in second backup system 120. With the example implementation of the present disclosure, by using virtual machine 422 as the receiving destination, the receipt of a backup copy from first backup system 110 can be controlled in a more convenient and flexible manner.

It may be understood that although obtaining backup copy 112 from first backup system 110 has been described above with reference only to FIG. 3, multiple backup copies can be acquired according to an example implementation of the present disclosure. Generally speaking, the capacities of first backup system 110 and second backup system 120 may be different. At this moment, a first capacity of first backup system 110 and a second capacity of second backup system 120 may be acquired, respectively. Furthermore, based on a comparison between the first capacity and the second capacity, it can be determined how many backup copies are acquired from first backup system 110.

According to an example implementation of the present disclosure, it is assumed that the second capacity of second backup system 120 is less than the first capacity of first backup system 110. At this moment, a part of backup copies may be selected from first backup system 110 based on the ratio of the second capacity to the first capacity. Particularly, assuming that the first capacity is 100 TB and the second capacity is 50 TB, then half of backup copies ($50/100=1/2$) can be selected from first backup system 110.

With the example implementation of the present disclosure, although only a part of backup copies are acquired from first backup system 110 to second backup system 120, the part of backup copies in second backup system 120 can be used as a data basis for subsequent normal backup operations, and this part of backup copies likely include some data of the data object to be backed up. In this way, in subsequent backup processes, the possibility of performing incremental transmission may be increased. Incremental backup here refers to only transmitting data that do not exist in second backup system 120 from application system 130 to second backup system 120. In this way, it is not necessary to back up all of data objects from application system 130 to second backup system 120.

According to an example implementation of the present disclosure, assuming that the second capacity is greater than or equal to the first capacity, then all backup copies can be transmitted from first backup system 110 to second backup system 120. At this moment, second backup system 120 includes all the backup systems of first backup system 110. Therefore, during subsequent normal backup operations, the possibility of performing incremental backups is further increased.

According to an example implementation of the present disclosure, for time overhead or other considerations, only a part of backup copies can be copied from first backup system 110 to second backup system 120. In this way, the time overhead of warm-up and the time overhead of subsequent normal backup operations can be balanced.

Figure 5:
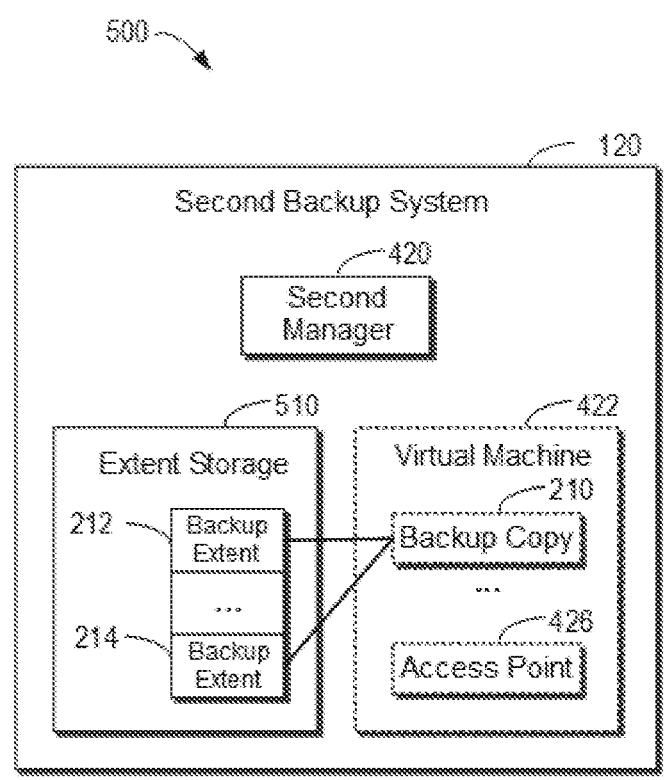
FIG. 5 schematically illustrates a block diagram of a process for dividing a backup copy into multiple backup extents according to an example implementation of the present disclosure.

Hereinafter, the description will return to FIG. 3 to describe how to process the obtained backup copy. At block 320 of FIG. 3, the backup copy is divided into multiple backup extents. Particularly, more details about the division are described with reference to FIG. 5. FIG. 5 schematically illustrates block diagram 500 of a process for dividing a backup copy into multiple backup extents according to an example implementation of the present disclosure. As shown in FIG. 5, second backup system 120 may include extent storage 510. Backup copy 210 may be divided into multiple backup extents 212, . . . , and 214. The backup extents obtained by the division may be stored to extent storage 510. After the backup extents from the backup copy have been stored to extent storage 510, virtual machine 422 can be deleted to save various overheads of second backup system 120. It may be understood that although only the division of backup copy 210 into multiple backup extents is shown above, a similar division operation can be performed on one or more other backup copies according to an example implementation of the present disclosure, so as to form more backup extents.

With the example implementation of the present disclosure, multiple backup extents in extent storage 510 can be used as a basis for subsequent normal backup operations. If extent storage 510 already includes a part of data in the data object to be backed up, it is not necessary to perform a full backup on the data object; instead, only the part that is not included in extent storage 510 needs to be transmitted from application system 130 to second backup system 120. In this way, the bandwidth and time overhead required during backup operations can be reduced. At this moment, the warm-up operation performed on second backup system 120 comes to an end, and second backup system 120 may enter a normal operation phase.

Hereinafter, the description will return to FIG. 3 to describe how second backup system 120 processes a backup request from application system 130 during normal operation. At block 330, a backup request for backing up data object 132 in application system 130 is received. Particularly, more details are described with reference to FIG. 6 which schematically illustrates block diagram 600 of a process for processing a backup request from application system 130 according to an example implementation of the present disclosure.

Figure 6:
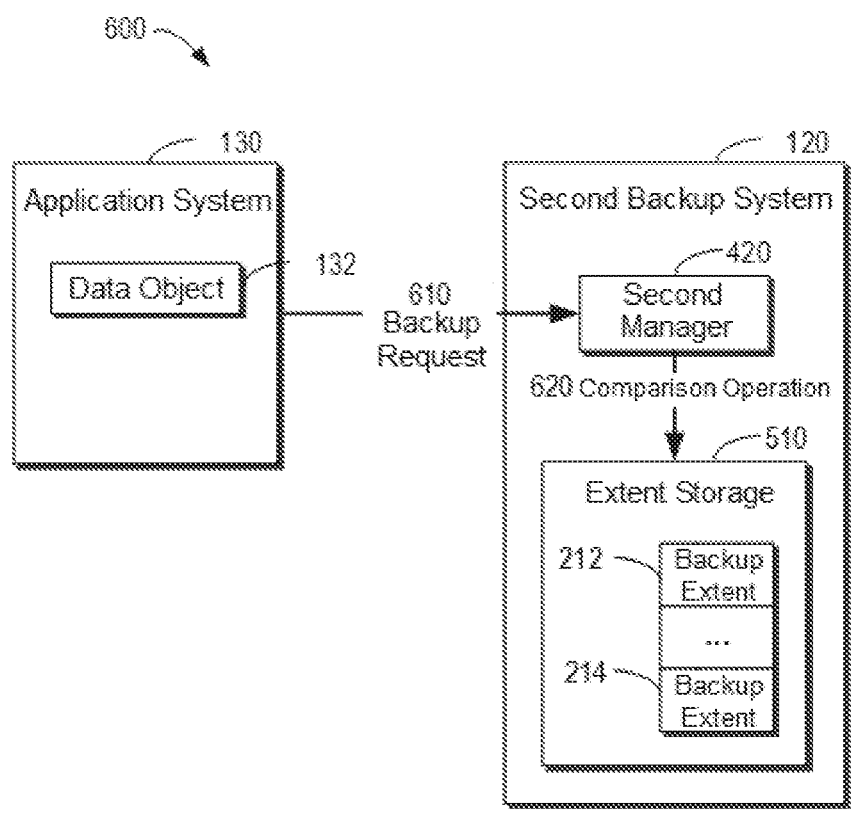
FIG. 6 schematically illustrates a block diagram of a process for processing a backup request from an application system according to an example implementation of the present disclosure.

In FIG. 6, application system 130 may send backup request 610 to second backup system 120 to request to back up current data object 132. After receiving backup request 610, second manager 420 may perform comparison operation 620. Particularly, second manager 420 can determine whether the hash of each extent in data object 132 is consistent with the hash of each backup extent in extent storage 510.

Returning to FIG. 3, at block 340, based on a comparison between data object 132 and the multiple backup extents, data object 132 is backed up to second backup system 120 to form a backup copy. If the multiple backup extents include at least a portion of data in data object 132, the data object may be backed up to second backup system 120 based on an incremental backup rule. Particularly, assuming that the hash of one extent in data object 132 is consistent with the hash of backup extent 212, it means that the data in this extent is already included in second backup system 120. At this moment, only extents that do not exist in second backup system 120 need to be transmitted based on an incremental manner. In this way, the amount of data transmission for normal backup operations can be reduced.

According to an example implementation of the present disclosure, if it is determined that the multiple backup extents do not include any data in data object 132, the data object is backed up to second backup system 120 based on a full backup rule. In a case where data object 132 has been backed up to second backup system 120 to generate a backup copy, the backup copy may be divided into multiple backup extents. At this moment, the multiple backup extents obtained by the division can be used as a basis for subsequent backup operations. As the amount of data in second backup system 120 increases, the possibility of performing incremental backups will continue to increase.

Figure 7:
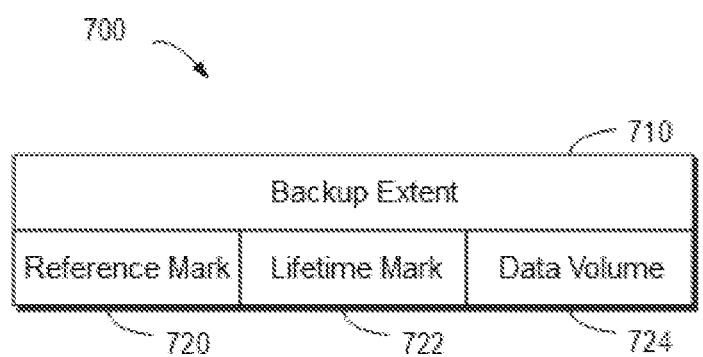
FIG. 7 schematically illustrates a block diagram of a data structure of a backup extent according to an example implementation of the present disclosure.

According to an example implementation of the present disclosure, a reference mark and a lifetime mark can be set for a backup extent to provide more assistance for managing the backup extent. FIG. 7 schematically illustrates block diagram 700 of a data structure of a backup extent according to an example implementation of the present disclosure. As shown in FIG. 7, reference mark 720 may be set in backup extent 710, wherein reference mark 720 indicates the count (expressed as an integer) of references of backup extent 710 by backup copies in second backup system 120. The higher the value of this count, the higher the number of references of backup extent 710. Assuming that reference mark 720 of backup extent 710 is zero, it means that backup extent 710 is not referenced by any backup copy. If backup extent 710 has not been referenced for a long time, deletion of backup extent 710 from second backup system 120 can be considered to save storage space.

According to an example implementation of the present disclosure, backup extent 710 may include lifetime mark 722, wherein this lifetime mark 722 indicates the lifetime of backup extent 710 in second backup system 120. Different backup extents may have different lifetimes. This lifetime can be set based on an update cycle of a data object itself involved in the backup block. For example, if the update cycle is long, the lifetime can be set to a large value; otherwise, the lifetime can be set to a small value. For example, lifetime mark 722 can be set to 7 days. With the operation of second backup system 120, lifetimes of backup extents can be continuously reduced. In this way, it can be convenient to clear expired backup extents away from second backup system 120.

Backup extent 710 may include data volume 724, wherein data volume 724 is used to store real backup data. According to an example implementation of the present disclosure, backup extent 710 may be deleted from second backup system 120 based on reference mark 722 and lifetime mark 724. Particularly, assuming that lifetime mark 722 is initially set to 7 days, then the lifetime can be reduced by 1 day per day. On the 7th day, the lifetime of backup extent 710 is reduced to 0. At this moment, whether backup extent 710 is referenced may be determined based on reference mark 720. If no backup copy references backup extent 710, this backup extent can be deleted. Otherwise, backup extent 710 may be kept. With the example implementation of the present disclosure, by using reference mark 720 and lifetime mark 722, backup extents in second backup system 120 can be managed in a more effective manner, and backup extents that are no longer referenced can be periodically cleared away.

Figure 8:
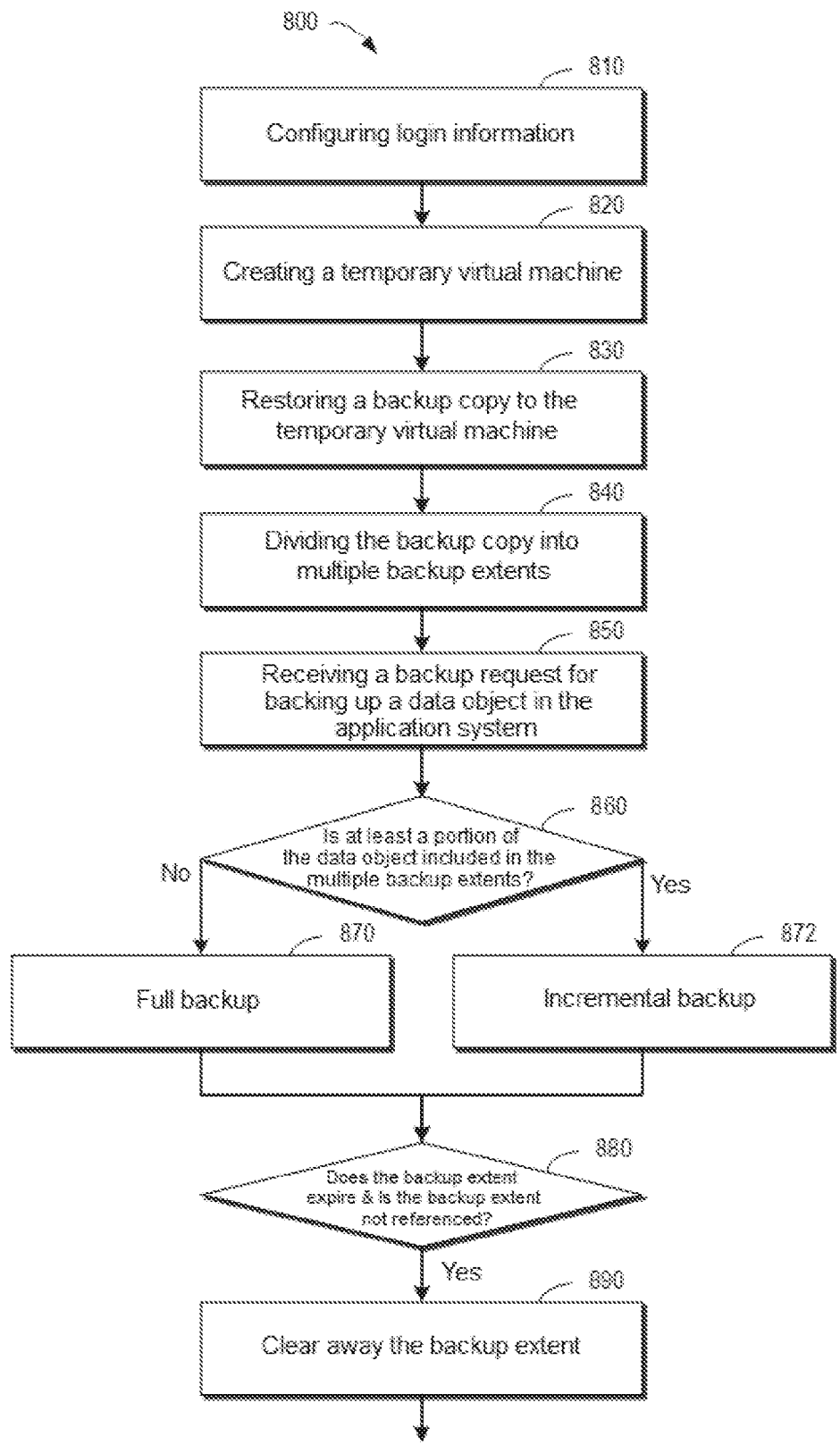
FIG. 8 schematically illustrates a flowchart of a method for migrating from a first backup system to a second backup system according to an example implementation of the present disclosure.

FIG. 8 schematically illustrates a flowchart of method 800 for migrating from first backup system 110 to second backup system 120 according to an example implementation of the present disclosure. As shown in FIG. 8, at block 810, login information can be configured. For example, an account number and a password for accessing first backup system 110 may be set at second backup system 120. At block 820, a temporary virtual machine may be created to serve as a destination of a restoration operation. At block 830, a backup copy from first backup system 110 may be restored to the temporary virtual machine. At block 840, the backup copy may be divided into multiple backup extents to serve as a basis for subsequent backup operations. The operations of blocks 810 to 840 are used for a warm-up phase of second backup system 120. Although not shown, method 800 may further include a step of deleting a temporary virtual machine according to an example implementation of the present disclosure.

At block 850, second backup system 120 may receive a backup request for backing up data object 132 in application system 130. At block 860, if the multiple backup extents include at least a portion of the data object, method 800 proceeds to block 872, and at this point, an incremental backup may be performed. If the result of determination at block 860 is no, method 800 may proceed to block 870 to perform a full backup. The operations of blocks 850 to 872 are used for a backup phase of second backup system 120.

At block 880, it can be determined whether each backup extent expires and whether each backup extent is referenced. If a certain backup extent has expired and is not referenced, method 800 proceeds to block 890 to delete this backup extent from second backup system 120. If this backup extent is referenced, this backup extent may be kept in second backup system 120. This concludes the process of migrating a backup system.

With the example implementation of the present disclosure, it can be ensured based on the operations of the warm-up phase that even when second backup system 120 is just put into use, there are some historical backup copies in second backup system 120. In this way, the possibility of performing a full copy can be reduced, and thus the amount of data transmitted from application system 130 to second backup system 120 can be reduced, and the required bandwidth can be reduced.

Examples of the method according to the present disclosure have been described in detail above with reference to FIGS. 2 to 8, and implementations of the corresponding apparatus is described below. Specifically, an apparatus for migrating a backup system is provided. This apparatus includes: a storage module configured to store a backup copy from a first backup system to a second backup system, wherein the first backup system is used to store historical backup copies of an application system, and the second backup system is used to store future backup copies of the application system; a division module configured to divide the backup copy into multiple backup extents; a receiving module configured to receive a backup request for backing up a data object in the application system; and a backup module configured to back up, based on a comparison between the data object and the multiple backup extents, the data object to the second backup system to form a backup copy corresponding to the data object. According to an example implementation of the present disclosure, the apparatus mentioned above further includes modules configured to perform other steps in method 300.

Figure 9:
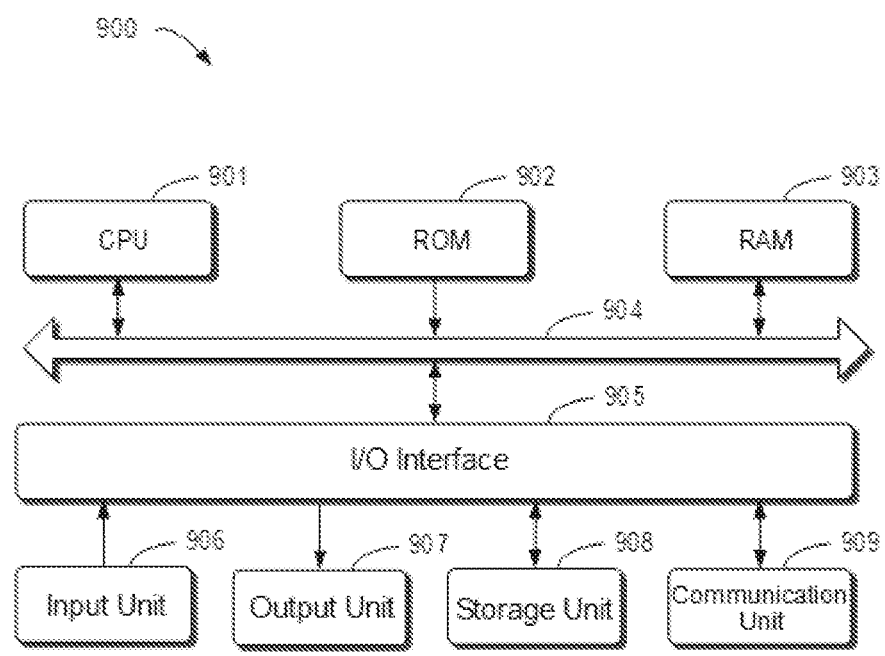
FIG. 9 schematically illustrates a block diagram of a device for migrating a backup system according to an example implementation of the present disclosure.

FIG. 9 schematically illustrates a block diagram of device 900 for migrating a backup system according to an example implementation of the present disclosure. As shown in the figure, device 900 includes general processing unit (CPU) 901 which can perform various appropriate actions and processing according to computer program instructions stored in read only memory (ROM) 902 or computer program instructions loaded from storage unit 908 into random access memory (RAM) 903. In RAM 903, various programs and data required for the operation of device 900 can also be stored. CPU 901, ROM 902, and RAM 903 are connected to each other through bus 904. Input/output (I/O) interface 905 is also connected to bus 904.

Multiple components in device 900 are connected to I/O interface 905, including: input unit 906, such as a keyboard or a mouse; output unit 907, such as various types of displays or speakers; storage unit 908, such as a magnetic disk or an optical disk; and communication unit 909, such as a network card, a modem, or a wireless communication transceiver. Communication unit 909 allows device 900 to exchange information/data with other devices through a computer network such as the Internet and/or various telecommunication networks.

The various processes and processing described above, for example, methods 300 and 800, can be performed by processing unit 901. For example, in some implementations, the methods mentioned above may be implemented as a computer software program that is tangibly included in a machine-readable medium, for example, storage unit 908. In some implementations, some or all of the computer program may be loaded and/or installed onto device 900 via ROM 902 and/or communication unit 909. When the computer program is loaded into RAM 903 and executed by CPU 901, one or more steps of the methods described above may be performed. Alternatively, in other implementations, CPU 901 may also be configured in any other suitable manner to implement the above process/method.

According to an example implementation of the present disclosure, an electronic device is provided, including: at least one processor; and a memory coupled to the at least one processor and having instructions stored therein, wherein the instructions, when executed by the at least one processor, cause the device to perform actions for migrating a backup system. The actions include: storing a backup copy from a first backup system to a second backup system, wherein the first backup system is used to store historical backup copies of an application system, and the second backup system is used to store future backup copies of the application system; dividing the backup copy into multiple backup extents; receiving a backup request for backing up a data object in the application system; and backing up, based on a comparison between the data object and the multiple backup extents, the data object to the second backup system to form a backup copy corresponding to the data object.

According to an example implementation of the present disclosure, backing up, based on the comparison, the data object to the second backup system includes: according to a determination that the multiple backup extents include at least a portion of data in the data object, backing up the data object to the second backup system based on an incremental backup rule.

According to an example implementation of the present disclosure, the actions further include: setting a reference mark for a backup extent of the multiple backup extents, wherein the reference mark indicates a count of references of the backup extent by backup copies in the second backup system.

According to an example implementation of the present disclosure, the actions further include: setting a lifetime mark for a backup extent, wherein the lifetime mark indicates the lifetime of the backup extent in the second backup system.

According to an example implementation of the present disclosure, the actions further include: deleting the backup extent from the second backup system based on the reference mark and the lifetime mark.

According to an example implementation of the present disclosure, the actions further include: acquiring a first capacity of the first backup system and a second capacity of the second backup system, respectively; selecting a set of backup copies from the first backup system based on a comparison between the first capacity and the second capacity; and storing the set of backup copies to the second backup system.

According to an example implementation of the present disclosure, storing the backup copy to the second backup system includes: establishing a communication connection between the second backup system and the first backup system with configuration information for accessing the first backup system; and sending, to the first backup system via the communication connection, a restoration request for restoring the backup copy.

According to an example implementation of the present disclosure, storing the backup copy to the second backup system further includes: establishing a virtual machine in the second backup system; and restoring the backup copy in the first backup system to the virtual machine according to receipt of a response to the restoration request from the first backup system.

According to an example implementation of the present disclosure, backing up, based on the comparison, the data object to the second backup system includes: according to a determination that the multiple backup extents do not include any data in the data object, backing up the data object to the second backup system based on a full backup rule.

According to an example implementation of the present disclosure, this device is deployed in the second backup system.

According to an example implementation of the present disclosure, a computer program product is provided. The computer program product is tangibly stored on a non-transitory computer-readable medium and includes machine-executable instructions that are used to implement the methods according to the present disclosure.

According to an example implementation of the present disclosure, a computer-readable medium is provided, wherein the computer-readable medium stores machine-executable instructions that, when executed by at least one processor, cause the at least one processor to implement the methods according to the present disclosure.

The present disclosure can be a method, a device, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, such as a punch card or a protruding structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (for example, light pulses through fiber-optic cables), or electrical signals transmitted via electrical wires.

The computer-readable program instructions described herein can be downloaded from a computer-readable storage medium to various computing/processing devices, or downloaded to an external computer or an external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages, such as Smalltalk and C++, and conventional procedural programming languages, such as the "C" language or similar programming languages. The computer-readable program instructions can be completely executed on a user's computer, partially executed on a user's computer, executed as a separate software package, partially executed on a user's computer and partially executed on a remote computer, or completely executed on a remote computer or a server. In cases where a remote computer is involved, the remote computer can be connected to a user's computer over any kind of networks, including a local area network (LAN) or a wide area network (WAN), or can be connected to an external computer (e.g., over the Internet by using an Internet service provider). In some implementations, an electronic circuit, for example, a programmable logic circuit, a field programmable gate array (FPGA), or a programmable logic array (PLA), is personalized by utilizing state information of computer-readable program instructions, and the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to implementations of the present disclosure. It should be understood that each block of the flowcharts and/or block diagrams and combinations of blocks in the flowcharts and/or block diagrams can be implemented by computer-readable program instructions.

These computer-readable program instructions can be provided to a processing unit of a general-purpose computer, a special-purpose computer, or another programmable data processing apparatus, thereby producing a machine, such that these instructions, when executed by the processing unit of the computer or another programmable data processing apparatus, produce a means for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner, such that the computer-readable medium having instructions stored includes an article of manufacture that includes instructions for implementing various aspects of the functions/actions specified in one or more blocks in the flowcharts and/or block diagrams.

The computer-readable program instructions can also be loaded onto a computer, another programmable data processing apparatus, or another device, so that a series of operating steps can be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple implementations of the present disclosure. In this regard, each block in the flowcharts or block diagrams may represent a module, a program segment, or a part of an instruction that contains one or more executable instructions for implementing specified logical functions. In some alternative implementations, functions labeled in the blocks may also occur in an order different from that labeled in the accompanying drawings. For example, two consecutive blocks may actually be executed substantially in parallel, and they may sometimes be executed in a reverse order, depending on the functions involved. It should also be noted that each block in the block diagrams and/or flowcharts and a combination of blocks in the block diagrams and/or flowcharts can be implemented using a dedicated hardware-based system for executing specified functions or actions, or can be implemented using a combination of dedicated hardware and computer instructions.

Various implementations of the present disclosure have been described above. The above description is illustrative but not exhaustive, and is not limited to the various implementations disclosed. Multiple modifications and variations will be apparent to those of ordinary skill in the art without departing from the scope and spirit of the illustrated various implementations. The selection of terms as used herein is intended to best explain the principles and practical applications of the various implementations or the improvements to technologies on the market, or to enable other persons of ordinary skill in the art to understand the implementations disclosed here.

The invention claimed is:

1. A method for migrating a backup system, comprising:
storing a backup copy from a first backup system to a second backup system, wherein the first backup system is used to store historical backup copies of an application system, and the second backup system is used to store future backup copies of the application system;
dividing the backup copy into multiple backup extents;
receiving a backup request for backing up a data object in the application system;
backing up, based on a comparison between the data object and the multiple backup extents, the data object to the second backup system to form a backup copy corresponding to the data object; and
setting a reference mark for a backup extent of the multiple backup extents, wherein the reference mark indicates a count of references of the backup extent by backup copies in the second backup system.

2. The method according to claim 1, wherein backing up, based on the comparison, the data object to the second backup system comprises: according to a determination that the multiple backup extents include at least a portion of data in the data object, backing up the data object to the second backup system based on an incremental backup rule.

3. The method according to claim 1, further comprising:
setting a lifetime mark for the backup extent, wherein the lifetime mark indicates a lifetime of the backup extent in the second backup system.

4. The method according to claim 3, further comprising:
deleting the backup extent from the second backup system based on the reference mark and the lifetime mark.

5. The method according to claim 1, further comprising:
acquiring a first capacity of the first backup system and a second capacity of the second backup system, respectively;
selecting a set of backup copies from the first backup system based on a comparison between the first capacity and the second capacity; and
storing the set of backup copies to the second backup system, wherein the backup copy is one of the set of backup copies.

6. The method according to claim 1, wherein storing the backup copy to the second backup system comprises:
establishing a communication connection between the second backup system and the first backup system with configuration information for accessing the first backup system; and
sending, to the first backup system via the communication connection, a restoration request for restoring the backup copy.

7. The method according to claim 6, further comprising:
establishing a virtual machine in the second backup system; and
restoring the backup copy in the first backup system to the virtual machine according to receipt of a response to the restoration request from the first backup system.

8. The method according to claim 1, wherein backing up, based on the comparison, the data object to the second backup system comprises: according to a determination that the multiple backup extents do not include any data in the data object, backing up the data object to the second backup system based on a full backup rule.

9. The method according to claim 1, wherein the second backup system divides the backup copy into the multiple backup extents.

10. An electronic device, comprising:
at least one processor; and
a memory coupled to the at least one processor and having instructions stored therein, wherein the instructions, when executed by the at least one processor, cause the electronic device to perform a method, the method comprising:
storing a backup copy from a first backup system to a second backup system, wherein the first backup system is used to store historical backup copies of an application system, and the second backup system is used to store future backup copies of the application system;
dividing the backup copy into multiple backup extents;
receiving a backup request for backing up a data object in the application system;
backing up, based on a comparison between the data object and the multiple backup extents, the data object to the second backup system to form a backup copy corresponding to the data object; and
setting a reference mark for a backup extent of the multiple backup extents, wherein the reference mark indicates a count of references of the backup extent by backup copies in the second backup system.

11. The electronic device according to claim 10, wherein backing up, based on the comparison, the data object to the second backup system comprises: according to a determination that the multiple backup extents include at least a portion of data in the data object, backing up the data object to the second backup system based on an incremental backup rule.

12. The electronic device according to claim 10, wherein the method further comprises:
setting a lifetime mark for the backup extent, wherein the lifetime mark indicates lifetime of the backup extent in the second backup system.

13. The electronic device according to claim 12, wherein the method further comprises:
deleting the backup extent from the second backup system based on the reference mark and the lifetime mark.

14. The electronic device according to claim 10, wherein the method further comprises:
acquiring a first capacity of the first backup system and a second capacity of the second backup system, respectively;
selecting a set of backup copies from the first backup system based on a comparison between the first capacity and the second capacity; and
storing the set of backup copies to the second backup system, wherein the backup copy is one of the set of backup copies.

15. The electronic device according to claim 10, wherein storing the backup copy to the second backup system comprises:
establishing a communication connection between the second backup system and the first backup system with configuration information for accessing the first backup system; and
sending, to the first backup system via the communication connection, a restoration request for restoring the backup copy.

16. The electronic device according to claim 15, wherein storing the backup copy to the second backup system further comprises:
establishing a virtual machine in the second backup system; and
restoring the backup copy in the first backup system to the virtual machine according to receipt of a response to the restoration request from the first backup system.

17. The electronic device according to claim 10, wherein backing up, based on the comparison, the data object to the second backup system comprises: according to a determination that the multiple backup extents do not include any data in the data object, backing up the data object to the second backup system based on a full backup rule.

18. A computer program product tangibly stored on a non-transitory computer-readable medium and comprising machine-executable instructions, wherein the machine-executable instructions are used to implement a method, the method comprising:
storing a backup copy from a first backup system to a second backup system, wherein the first backup system is used to store historical backup copies of an application system, and the second backup system is used to store future backup copies of the application system;
dividing the backup copy into multiple backup extents;
receiving a backup request for backing up a data object in the application system;
backing up, based on a comparison between the data object and the multiple backup extents, the data object to the second backup system to form a backup copy corresponding to the data object; and
setting a reference mark for a backup extent of the multiple backup extents, wherein the reference mark indicates a count of references of the backup extent by backup copies in the second backup system.

* * * * *